(12) United States Patent
Namba

(10) Patent No.: US 6,681,224 B2
(45) Date of Patent: Jan. 20, 2004

(54) METHOD AND DEVICE FOR SORTING DATA, AND A COMPUTER PRODUCT

(75) Inventor: Isao Namba, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 290 days.

(21) Appl. No.: 09/795,489

(22) Filed: Mar. 1, 2001

(65) Prior Publication Data

US 2002/0032683 A1 Mar. 14, 2002

(30) Foreign Application Priority Data

Jul. 31, 2000 (JP) .................................... 2000-232349

(51) Int. Cl.[7] .......................... G06F 17/30; G06F 12/00
(52) U.S. Cl. ........................ 707/7; 707/10; 707/103 R; 707/104.1; 711/108; 711/206; 711/207; 711/208; 711/209
(58) Field of Search .................. 707/7, 10, 103 R, 707/104.1; 711/108, 206, 207, 208, 209

(56) References Cited

U.S. PATENT DOCUMENTS

| | | | | |
|---|---|---|---|---|
| 5,396,622 A | * | 3/1995 | Lee et al. ................... 395/600 |
| 5,729,732 A | * | 3/1998 | Gal et al. ................... 395/607 |
| 5,842,207 A | * | 11/1998 | Fujiwara et al. ................ 707/7 |
| 5,924,091 A | * | 7/1999 | Burkhard ........................ 707/7 |
| 5,926,807 A | * | 7/1999 | Peltonen et al. ................ 707/3 |
| 5,938,044 A | * | 8/1999 | Weggesser ................... 209/534 |
| 6,105,024 A | * | 8/2000 | Graefe et al. ................... 707/7 |
| 6,142,470 A | * | 11/2000 | Noda et al. ................. 271/292 |
| 6,199,064 B1 | * | 3/2001 | Schindler ........................ 707/7 |
| 6,519,593 B1 | * | 2/2003 | Matias et al. ................... 707/7 |
| 6,552,723 B1 | * | 4/2003 | Duluk et al. ................. 345/419 |
| 6,584,514 B1 | * | 6/2003 | Smith ........................... 710/26 |
| 6,610,954 B2 | * | 8/2003 | Takizawa ................... 209/583 |

* cited by examiner

*Primary Examiner*—Frantz Coby
(74) *Attorney, Agent, or Firm*—Staas & Halsey LLP

(57) ABSTRACT

The sorting device comprises a distribution monitoring and cell splitting section which analyzes a distribution of a sort target data group consisting sort target data and obtains an appearance frequency of the sort target data for each sorting segment based on a sorting key. A sorting segment setting section sets sorting segments for dividing the sort target data group into segments based on the analysis by the distribution monitoring and cell splitting section. A sorting mode selection section selects a quick sorting mode if the appearance frequency is equal to or higher than a preset threshold and selects a radic sorting mode if the appearance frequency is lower than the threshold, for each sorting segment. A sorting execution section executes sorting for each sorting segment based on the selected sorting mode.

7 Claims, 9 Drawing Sheets

FIG.2A

| DOCUMENT NUMBER | DOCUMENT |
|---|---|
| 1 | This is a book |
| 2 | That is a book |
| 3 | The book is on the table |
| ⋮ | ⋮ |
| N | Zoo is ⋯ |

| WORD NUMBER | WORD |
|---|---|
| 1 | This |
| 2 | is |
| 3 | a |
| 4 | book |
| 5 | That |
| 6 | the |
| 7 | on |
| 8 | table |
| ⋮ | ⋮ |
| 25000 | Zoo |
| ⋮ | ⋮ |

| CELL NUMBER | 0 | 1 | 2 | 3 | ... | 10 | ... |
|---|---|---|---|---|---|---|---|
| WORD NUMBER RANGE | <=2 | <=4 | <=8 | <=16 | ... | <=1024 | ... |
| APPEARANCE FREQUENCY | | | | | | | |
| DATA STARTING POSITION | | | | | | | |
| SORTING MODE | | | | | | | |

Pc points to cell 0. Cells labeled $92_0$, $92_1$, $92_2$, $92_3$, $92_{10}$.

FIG.4B

| CELL NUMBER | 0 | 1 | 2 | 3 | ... | 10 | ... |
|---|---|---|---|---|---|---|---|
| WORD NUMBER RANGE | <=2 | <=4 | <=8 | <=16 | ... | <=1024 | ... |
| APPEARANCE FREQUENCY | 65000 | 31000 | 15000 | 7500 | ... | 100 | ... |
| DATA STARTING POSITION | | | | | | | |
| SORTING MODE | | | | | | | |

FIG.4C

| CELL NUMBER | 0 | 1 | 2 | 3 | ... | 10 | ... |
|---|---|---|---|---|---|---|---|
| WORD NUMBER RANGE | <=2 | <=4 | <=8 | <=16 | ... | <=1024 | ... |
| APPEARANCE FREQUENCY | 65000 | 31000 | 15000 | 7500 | ... | 100 | ... |
| DATA STARTING POSITION | | | | | | | |
| SORTING MODE | quick | radic | radic | radic | ... | radic | ... |

FIG.4D

| CELL NUMBER | 0 | 1 | 2 | 3 | ... | 10 | ... |
|---|---|---|---|---|---|---|---|
| WORD NUMBER RANGE | <=2 | <=4 | <=8 | <=16 | ... | <=1024 | ... |
| APPEARANCE FREQUENCY | 65000 | 31000 | 15000 | 7500 | ... | 100 | ... |
| DATA STARTING POSITION | 0 | 65000 | 96000 | 111000 | ... | 168000 | ... |
| SORTING MODE | quick | radic | radic | radic | ... | radic | ... |

$92_0$: [1,1], [1,5], [1,1], ...  
$92_1$: [3,3], [4,2], [3,6], ...  
$92_2$: [5,4], [7,5], [6,3], ...

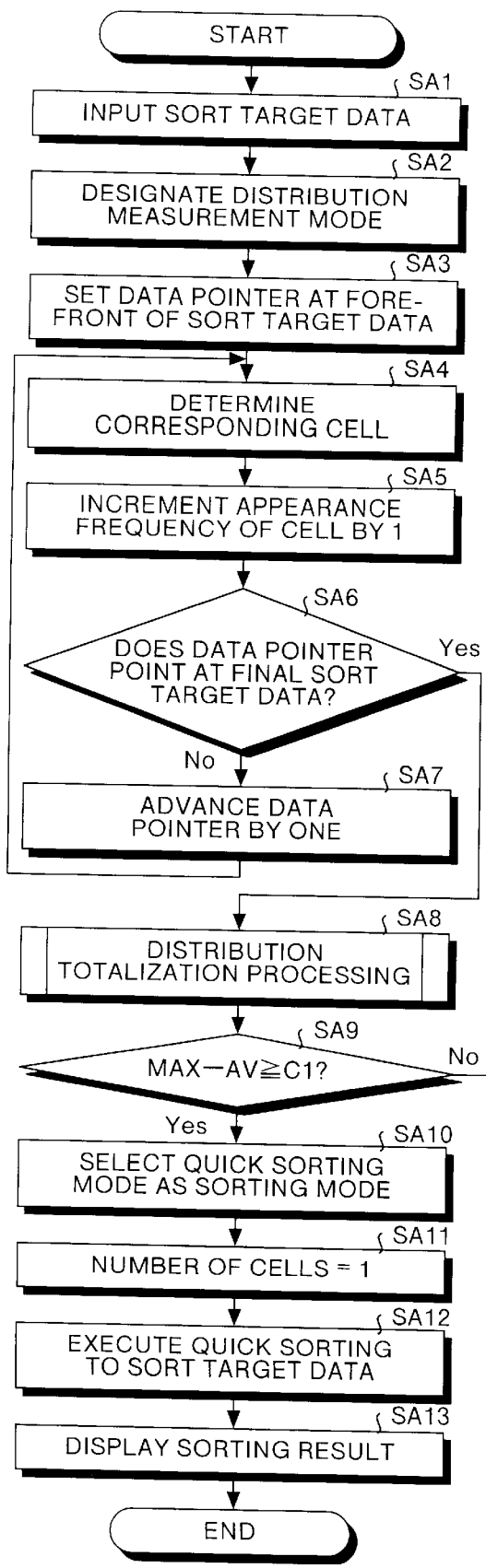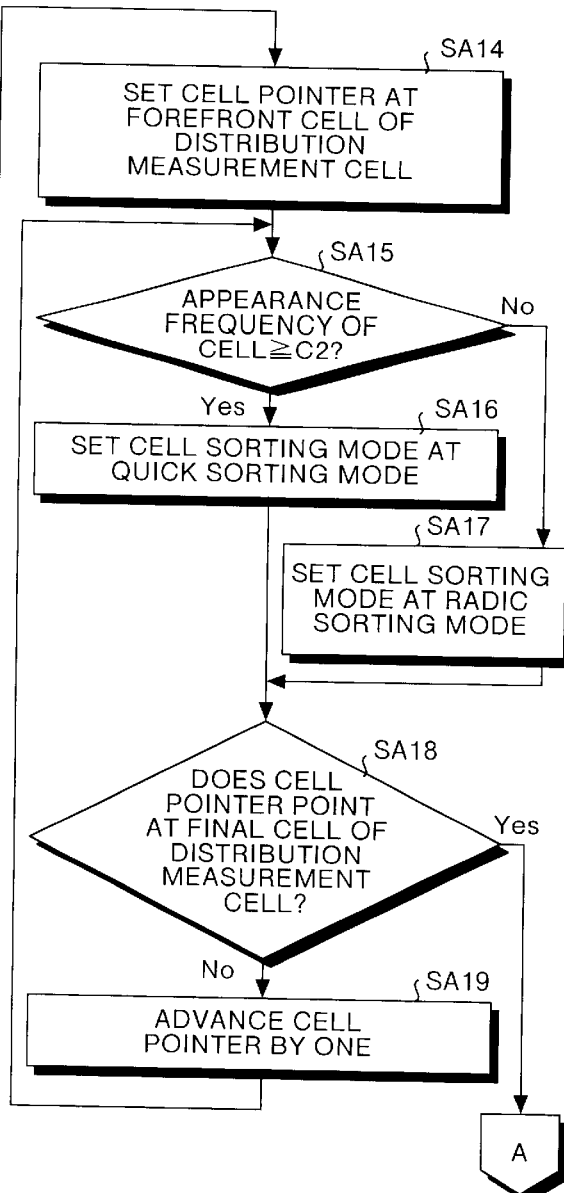
FIG.5

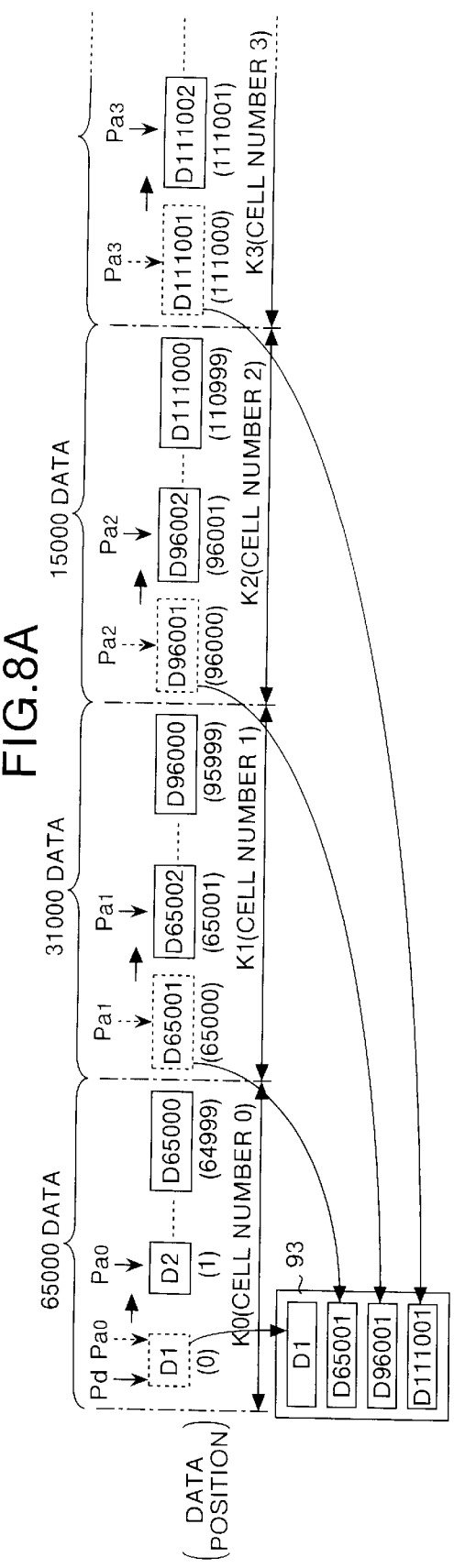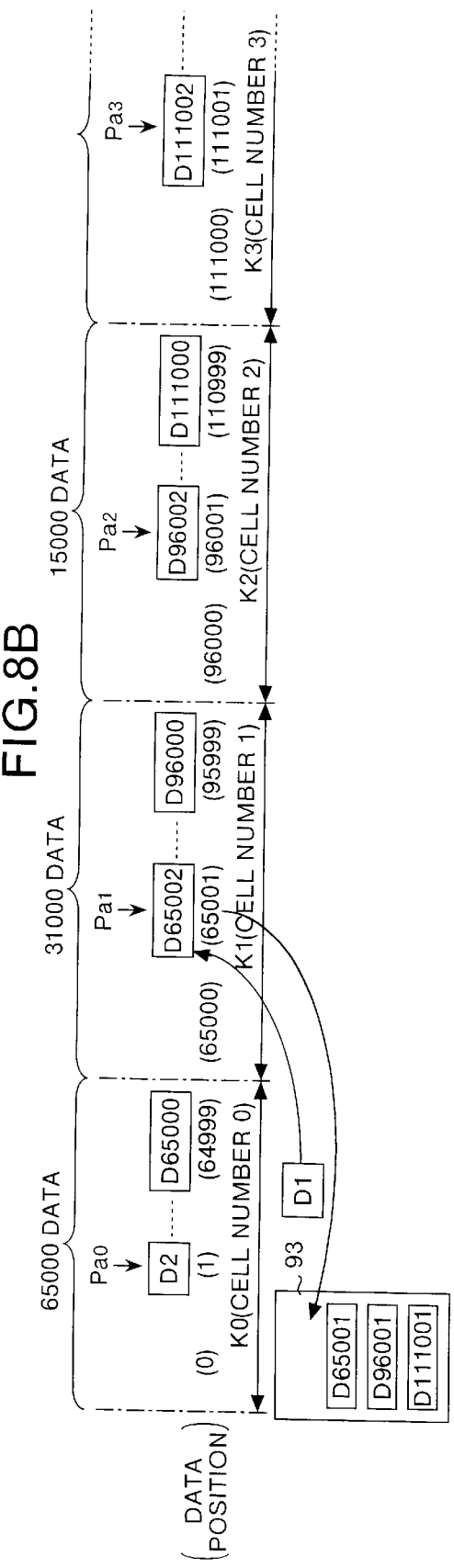

METHOD AND DEVICE FOR SORTING DATA, AND A COMPUTER PRODUCT

FIELD OF THE INVENTION

The present invention in general relates to a technology for sorting data, such as numerical values or text. More particularly, this invention relates to a technology with which the data can be sorted speedily.

BACKGROUND OF THE INVENTION

Various modes (i.e. systems, or methods) that are used when sorting data are. For example, the well-known quick sorting mode, a radic sorting mode, and a multiple division sorting mode are known conventionally. These sorting modes are not, however, universal since they have both merits and demerits depending on the quantity and properties of data to be sorted. It is, therefore, necessary to involve a person familiar with sort target data and sorting modes and having advanced knowledge in the selection of a sorting mode. From this, means and methods with which even a person who does not have advanced knowledge about sorting can appropriately execute sorting have been conventionally demanded.

As one of the sorting modes, the above-stated quick sorting mode, radic sorting mode, multiple division sorting mode and the like are conventionally employed in various fields. The quick sorting mode is to execute sorting at high speed by dividing sort target data into small groups. Description will be given to procedures for sorting sort target data by quick sorting with reference to the following terms (a-1) to (e-1).

| (a-1) | 5* | 6 | 3 | 2 | 8 | 4 | 7 | 1 |
| (b-1) | (3 | 2 | 4 | 1) | 5* | (6 | 8 | 7) |
| (c-1) | (3* | 2 | 4 | 1) | 5 | (6* | 8 | 7) |
| (d-1) | (2* | 1) | 3 | 4 | 5 | 6 | (8* | 7) |
| (e-1) | 1 | 2 | 3 | 4 | 5 | 6 | 7 | 8 |

First, if sort target data in a sequence shown in the term (a-1) are given, the forefront data or "5" (indicated by symbol *) is selected as a reference value. Next, as shown in the term (b-1), lower values ("3", "2", "4" and "1") than the reference value "5" (indicated by symbol *) are put before the reference value "5" and higher values ("6", "8" and "7") than the reference value "5" are put after the reference value "5". In this way, the term (b-1) is divided into unsorted two groups as indicated by brackets, i.e., a group ("3", "2", "4" and "1") put before the reference value "5" and a group ("6", "8" and "7") put after the reference value "5".

Next, in the term (c-1), "3" (indicated by symbol *) and "6" (indicated by symbol *) at the forefronts of two bracketed groups are selected as reference values, respectively. Next, as shown in the term (d-1), lower values ("2" and "1") than a reference value "3" are put before the reference value "3" and a higher value ("4") than the reference value "3" is put after the reference value "3" in one group. Higher values ("8" and "7") than a reference value "6" are put before the reference value "6" in the other group. In the other group, no value lower than the reference value "6" exists.

As a result, the term (d-1) is divided into two unsorted groups, i.e., the bracketed group ("2" and "1") put before the reference value "3" and the bracketed group ("8" and "7") put after the reference value "6". Next, in the term (e-1), "2" (indicated by symbol *) and "8" (indicated by symbol *) at the forefronts of the two bracketed groups are set as reference values, respectively.

Next, as shown in the term (e-1), a lower value ("1") than the reference value "2" is put before the reference value "2" in one group. In this case, no value higher than the reference value "2" exists. A lower value ("7") than the reference value "8" is put before the reference value "8" in the other group. In the other group, no higher value than the reference value "8" exists. Through the above-stated quick sorting procedures, the sort target data shown in the term (a-1) are sorted as shown in the term (e-1) in ascending order.

In case of the quick sorting stated above, as sorting (the division of the sort target data) proceeds, access to a memory storing the sort target data becomes local. Due to this, the quick sorting is characterized by high sorting speed. Here, the sorting speed $O_q$ of the quick sorting is expressed by the following formula (1) while assuming that the number of sort target data is n:

$$O_q = n \cdot \log_2 n \tag{1}$$

Further, the radic sorting stated above is a mode for dividing sort target data into figures and executing sorting for each figure. Procedures for sorting sort target data by means of radic sorting will be described next with reference to the following terms (a-2) to (c-2):

| (a-2) | 17 20 30 45 46 | |
| (b-2) | 20 30 45 46 17 | (sorted with first figures as keys) |
| (c-2) | 17 20 30 45 46 | (sorted with second figures as keys) |

In case of executing the radic sorting, two buffers (which will be referred to as "buffer A" and "buffer B") are used. Namely, sort target data (two-figure numerical value) in the term (a-2) are sorted in ascending order with first figures as keys, as shown in the term (b-2). The sorting result is stored in the buffer A. Next, as shown in the term (c-2), the sorting result stored in the buffer A is sorted in ascending order with second figures as keys. This sorting result is stored in the buffer B. In this way, the radic sorting is required to access the buffers by as much as the number of figures of the sort target data.

The sorting speed $O_r$ of the above-stated radic sorting is expressed by the following formula (2) while assuming that the number of the figures of the sort target data is m and the number of the sort target data is n:

$$O_r = m \cdot n \tag{2}$$

Further, the multiple division sorting is a mode devised to accelerate the sorting speed of the quick sorting stated above. In this multiple division sorting mode, sort target data are divided into segments in advance and quick sorting is executed in units of divided segments. Here, the sorting speed $O_m$ of the multiple division sorting is expressed by the following formula (3) while assuming that the number of segments is L and the number of the sort target data is n, and the sorting speed $O_m$ is expected to be higher than the sorting speed $O_q$ of the quick sorting expressed by the formula (1) by n/L:

$$O_m = L \cdot (n/L) \cdot \log_2(n/L) \tag{3}$$

Meanwhile, as described above, as sorting proceeds, access to the memory becomes local in the quick sorting. Due to this, the quick sorting has normally, advantageously high sorting speed. However, if the quantity of the sort target data is small, the sorting speed of the quick sorting becomes disadvantageously lower than the sorting speed of the radic sorting as can be seen from the formulas (1) and (2).

The radic sorting has, by contrast, advantageously high sorting speed if the number of the sort target data is small. Actually, however, in case of the radio sorting, if the capacities of buffers are insufficient relatively to the quantity of the sort target data, it is necessary to secure a sorting region in a main storage region which is accessed slow. In this case, the access time of the main storage region has an adverse effect on the sorting speed of the radic sorting, and the sorting speed becomes eventually, disadvantageously lower.

Further, in theory, the multiple division sorting can advantageously execute sorting at higher speed than that of the quick sorting if the sort target data is optimally divided into segments. Actually, however, if the sort target data is not divided into segments in consideration of data distributed conditions, segment division often fails. As a result, the segment division time is consumed for nothing, and the sorting speed becomes disadvantageously lower than that of the quick sorting.

As can be seen from the above, the quick sorting algorithm, the radic sorting algorithm and the multiple division sorting algorithm have both merits and demerits depending on the quantity and properties of sort target data and these modes are not, therefore, not universal. For that reason, if a sorting mode having high sorting speed is selected, it is necessary to involve a person familiar with sort target data and sorting modes.

SUMMARY OF THE INVENTION

It is an object of the present invention to provide a sorting device, a sorting method and a computer readable recording medium recording a sorting program capable of automatically selecting a sorting mode corresponding to the properties and quantity of sort target data and accelerating sorting speed.

The sorting device according to one aspect of this invention comprises a distribution analyzing unit which analyzes a distribution of a sort target data group consisting of a plurality of sort target data; a setting unit which sets sorting segments for dividing the sort target data group into segments based on an analysis result of the distribution analyzing unit; an appearance frequency calculation unit which calculates an appearance frequency of a sort target data corresponding to each sorting segment based on a sorting key; a sorting mode selection unit which selects a first sorting mode if the appearance frequency is equal to or higher than a preset threshold value and selecting a second sorting mode if the appearance frequency is lower than the threshold value, for each sorting segment; and a sorting execution unit which executes sorting for each of the sorting segments based on the sorting mode selected by the sorting mode selection unit.

The sorting method according to another aspect of this invention comprises the following steps. That is, a distribution analyzing step of analyzing a distribution of a sort target data group consisting of sort target data; a setting step of setting sorting segments for dividing the sort target data group into segments based on an analysis result of the distribution analyzing step; an appearance frequency calculation step of obtaining an appearance frequency of a sort target data corresponding to each sorting segment based on a sorting key; a sorting mode selection step of selecting a first sorting mode if the appearance frequency is equal to or higher than a preset threshold value and selecting a second sorting mode if the appearance frequency is lower than the threshold value, for each sorting segment; and a sorting execution step of executing sorting for each of the sorting segments based on the sorting mode selected by the sorting mode selection means.

According to the above-mentioned aspects of this invention, sorting segments are set based on the result of analyzing the distribution of the sort target data group, the appearance frequency of the sort target data is obtained for each sorting segment, and either the first sorting mode or the second sorting mode is selected for each sorting segment depending on the result of the comparison of the appearance frequency to the threshold value. Thus, this invention can automatically select a sorting mode corresponding to the distribution (properties and quantity) of the sort target data group and accelerate sorting speed compared with conventional sorting speed.

Other objects and features of this invention will become apparent from the following description with reference to the accompanying drawings.

BRIEF DESCRIPTION OF THE DRAWINGS

FIG. 2A shows a document/document number correspondence table 80, and FIG. 2B shows a word/word number correspondence table 81 used in this embodiment;

FIG. 4A to FIG. 4D show a distribution measurement cell 92 used in this embodiment;

FIG. 5 is a flow chart for describing the operation of this embodiment;

FIG. 8A and FIG. 8B are explanatory views of a sort target data segment portioning-out processing in this embodiment.

DESCRIPTION OF THE PREFERRED EMBODIMENTS

A preferred embodiment of a sorting device, a sorting method and a computer readable recording medium recording a sorting program according to the present invention will be described hereinafter with reference to the accompanying drawings.

Figure 1:
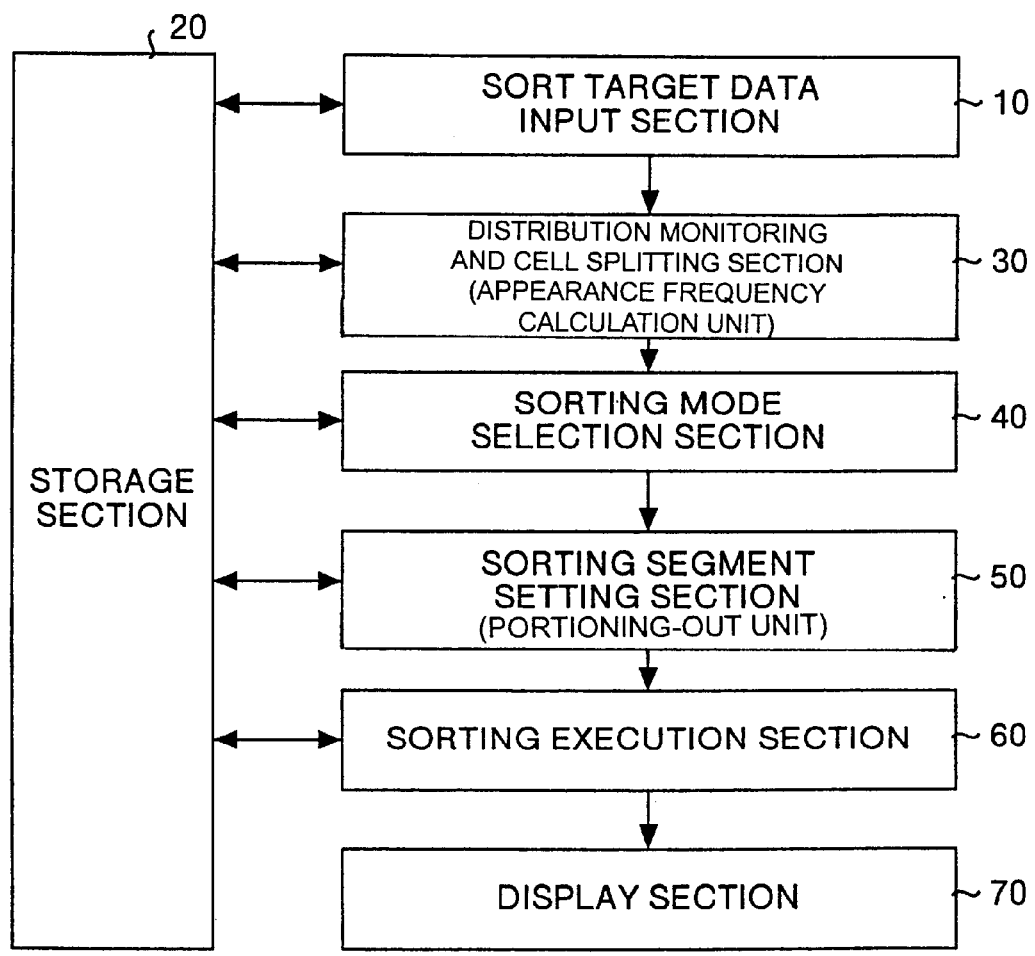
FIG. 1 is a block diagram showing the constitution of one embodiment according to the present invention.

FIG. 1 is a block diagram showing one embodiment according to the present invention. In FIG. 1, a sort target data input section 10 has a function of, for example, inputting sort target data. The sort target data means data (of eight bytes in data size) to be sorted based on a sorting mode such as a quick sorting mode and a radic sorting mode to be described later. Description will be given hereinafter while taking, as an example, a case where words included in a document are used as sort target data. To be specific, sort target data is generated from a document/document number correspondence table 80 (see FIG. 2A) and a word/word number correspondence table 81 (see FIG. 2B).

The document/document number correspondence table 80 shown in FIG. 2A is a table representing the correspondence of a plurality of documents (This is a book, That is a book, . . . ) to document numbers (1 to N) given to these documents, respectively. The table 80 is stored in a storage section 20. The word/word number correspondence table 81 shown in FIG. 2B is a table representing the correspondence of a plurality of words (This, is, a, book, that, . . . ) included in the plural documents of the document/document number correspondence table 80 to word numbers (1, 2, 3, . . . , 25000, . . . ) given to these words, respectively. The table 81 is stored in the storage section 20.

Figure 3A:
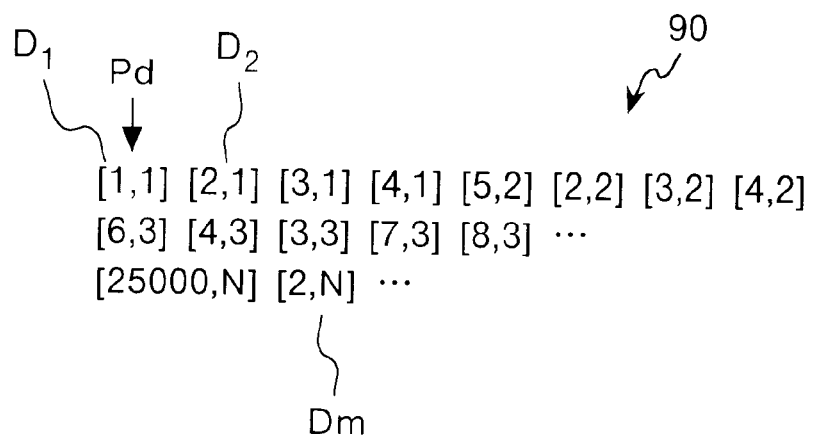
FIG. 3A shows a sort target data group 90.

In one embodiment, as shown in FIG. 3A, the words are corresponded to the document numbers and word numbers and the corresponding words, document numbers and word numbers are set as sort target data $D_1$, $D_2$ to $D_m$, . . . (to be generally referred to as "target data group 90"), respectively. The sort target data $D_1$, for example, corresponds to the word (This) with the word number 1 shown in FIG. 2B and expressed as [1, 1]. A right numeral in [1, 1] corresponds to the document number shown in FIG. 2A and a left numeral corresponds to the word number 1 shown in FIG. 2B. Likewise, the sort target data $D_2$ corresponds to the word (is) with the word number 2 shown in FIG. 2B and expressed as [2, 1]. A right numeral in [2, 1] corresponds to the document number 1 shown in FIG. 2A and a left numeral corresponds to the word number 2 shown in FIG. 2B.

Figure 3B:
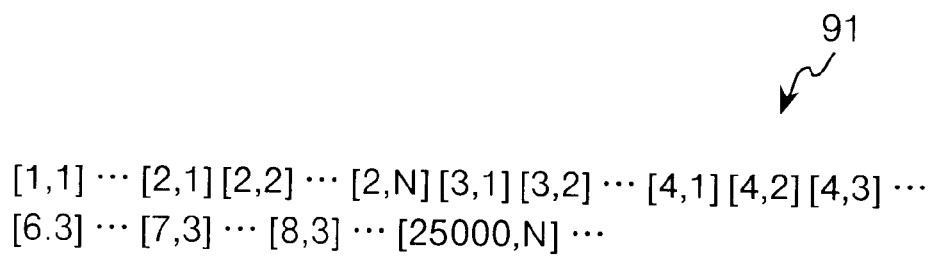
FIG. 3B shows sorting result data 91 in this embodiment.

Returning to FIG. 1, the storage section 20 stores the document/document number correspondence table 80, the word/word number correspondence table 81, the sort target data group 90, sorting result data 91 (see FIG. 3B), a distribution measurement cell 92 (see FIG. 4A and various data. The distribution measurement cell 92 is a worksheet used to measure the distribution of the sort target data group 90, to determine a sorting method and the like.

Specifically, the distribution measurement cell 92 has cells $92_0$ to $92_{10}$, . . . given cell numbers 0 to 10, . . . , respectively. These cells $92_0$ to $92_{10}$, . . . correspond to the range (sorting segments) of the word numbers shown in FIG. 2B. The cell $92_0$, for example, corresponds to the range of word numbers 1 and 2 and the cell $92_1$ corresponds to the range of the word numbers 3 and 4.

The distribution measurement cell 92 also has records of "word number range", "appearance frequency", "data starting position" and "sorting mode". "Word number range" is a record representing the range of word numbers on the word/word number correspondence table 81 shown in FIG. 2B. "Appearance frequency" is a record representing the appearance frequency (appearance times) of the sort target data (words) in the "word number range". "Data starting position" is a record representing the position of the sort target data located at the start of each sorting segment. "Sorting mode" is a record representing a sorting mode (quick sorting mode or radic sorting mode) adopted in each sorting segment.

Returning to FIG. 1, a distribution monitoring and cell splitting section 30 splits the sort target data group (see FIG. 3A). The result is stored in the "appearance frequency" of the distribution measurement cell 92 (see FIG. 4A). A sorting method selection section 40 selects an appropriate sorting mode for each sorting segment based on the distribution totalization result of the distribution monitoring and cell splitting section 30.

Specifically, if "appearance frequency" is equal to or higher than 32768, the sorting mode selection section 40 selects the quick sorting mode as a sorting mode for the sorting segment. If "appearance frequency" is lower than 32768, the sorting mode selection section 40 selects the radic sorting mode as a sorting mode for the sorting segment. The parameter is depending on the L2 cache size of CPU. A sorting segment setting section 50 sets sorting segments. A sorting execution section 60 executes sorting for each sorting segment according to the sorting mode selected by the sorting mode selection section 40. A display section 70 displays the sorting result of the sorting execution section 60.

Figure 6:
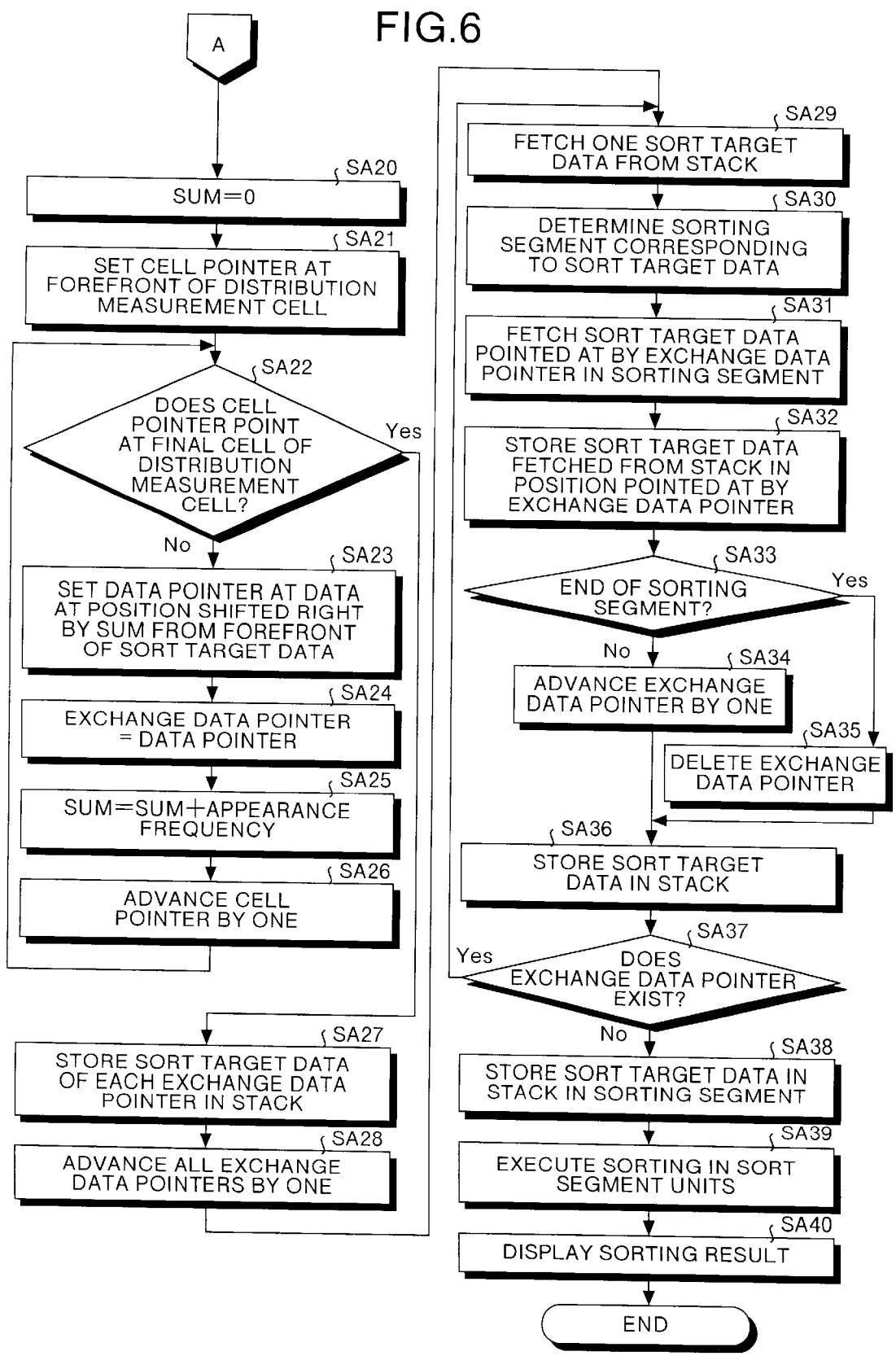
FIG. 6 is a flow chart for describing the operation of this embodiment.
Figure 7:
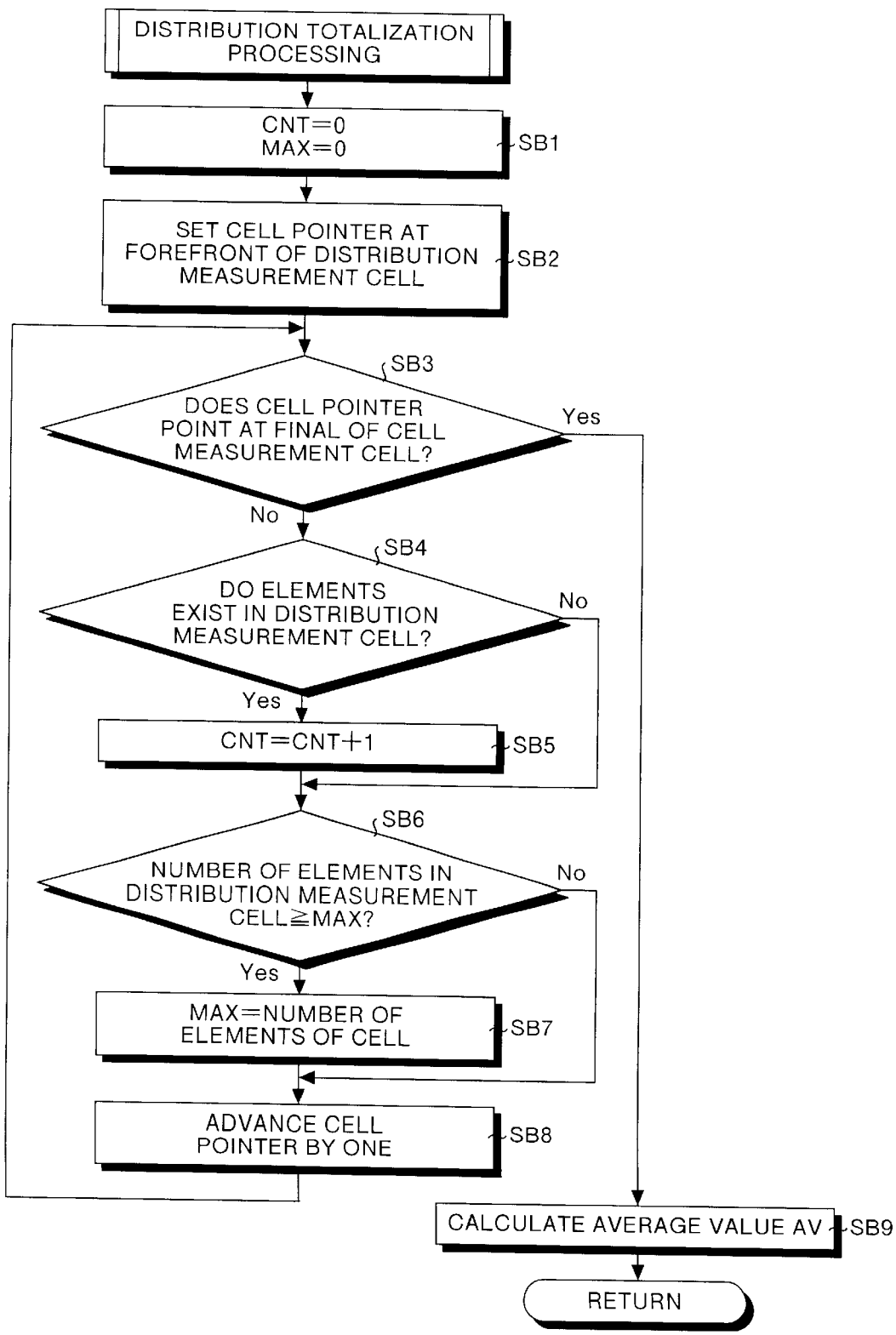
FIG. 7 is a flow chart for describing a distribution totalization processing shown in FIG. 5.

Operation of the above-explained embodiment will be described with reference to FIG. 5 to FIG. 8B. FIG. 5 and FIG. 6 are flow charts for describing the operation of one embodiment. FIG. 7 is a flow chart for describing a distribution totalization processing shown in FIG. 5. FIG. 8A and FIG. 8B are explanatory views of a processing for portioning out sort target data to segments in one embodiment.

In a step SA1 shown in FIG. 5, the sort target data input section 10 inputs the sort target data group 90 (see FIG. 3A) and stores the group 90 in the storage section 20. In a step SA2, the distribution monitoring and cell splitting section 30 designates the distribution measurement mode of the sort target data group 90. In this case, if the sort target data group 90 is distributed according to a log distribution, the distribution monitoring and cell splitting section 30 designates the mode based on the log distribution as a distribution measurement mode.

In a step SA3, the distribution monitoring and cell splitting section 30 sets a data pointer $P_d$ at the forefront (sort target data $D_1$) of the sort target data group 90. In a step SA4, the distribution monitoring and cell splitting section 30 determines a cell corresponding to the sort target data $D_1$ from among the cells $92_0$ to $92_{10}$, . . . in the distribution measurement cell 92 shown in FIG. 4A while the word number 1 of the sort target data $D_1$ corresponding to the data pointer $P_d$ as a key. In this case, the distribution monitoring and cell splitting section 30 determines the cell $92_0$ (word number range=1, 2) since the word number of the sort target data $D_1$ is 1.

In a step SA5, the distribution monitoring and cell splitting section 30 increments the "appearance frequency" of the cell $92_0$ determined in the step SA4 by 1. In a step SA6, the distribution monitoring and cell splitting section 30 judges whether or not the data pointer $P_d$ shown in FIG. 3A points at the end of the sort target data group 90 and the judgment result in this case is assumed to be "No". In a step SA7, the distribution monitoring and cell splitting section 30 advances the data pointer $P_d$ shown in FIG. 3A by one. By doing so, the data pointer $P_d$ is set at the next sort target data $D_2$. Thereafter, the steps SA4 to SA7 are repeated, thereby incrementing the "appearance frequency" of each of the cells $92_0$ to $92_{10}$, . . . shown in FIG. 4A by 1.

If the judgment result of the step SA6 is "Yes", the distribution monitoring and cell splitting section 30 executes a distribution totalization processing in a step SA8. At this moment, a numerical values representing the distribution of the sort target data group 90 are stored in the "appearance frequency" in each of the cells in the distribution measurement cell 92 as shown in FIG. 4B. For example, the "appearance frequency" of the cell $92_0$ (word numbers 1 and 2) is 65000. This means that 65000 sort target data having the word numbers 1 or 2 are included in the sort target data group 90.

Now, the distribution totalization processing will be described in more detail with reference to FIG. 7. In a step SB1 shown in FIG. 7, the distribution monitoring and cell splitting section 30 assigns 0 to an internal variable CNT and internal variable MAX, respectively. In a step SB2, the distribution monitoring and cell splitting section 30 sets a cell pointer $P_c$ at the forefront cell (cell $92_0$) of the distribution measurement cell 92 shown in FIG. 4B. In a step SB3, the distribution monitoring and cell splitting section 30 judges whether or not the cell pointer $P_c$ points at the final cell of the distribution measurement cell 92 and the judgment result in this case is assumed to be "No".

In a step SB4, the distribution monitoring and cell splitting section 30 judges whether or not elements (the values of the "appearance frequency") exist in the cell (cell $92_0$) pointed at by the cell pointer $P_c$. In this case, "appearance frequency"=65000 exists as elements. Therefore, the distribution monitoring and cell splitting section 30 judges "Yes" in the step SB4. If the judgment result of the step SB4 is "No", the distribution monitoring and cell splitting section 30 makes a judgment in a step SB6. In this case, in the step SB5, the distribution monitoring and cell splitting section 30 increments the internal variable CNT by 1.

In the step SB6, the distribution monitoring and cell splitting section 30 judges whether or not the number of elements of the corresponding cell (the values of "appearance frequency") is greater than the internal variable MAX ("0" in this case) and the judgment result in this case is assumed to be "Yes". If the judgment result of the step SB6 is "No", the distribution monitoring and cell splitting section 30 assigns the number of elements ("appearance frequency"=65000 in this case) to the internal variable MAX. In a step SB8, the distribution monitoring and cell splitting section 30 advances the cell pointer $P_c$ shown in FIG. 4B by one. By doing so, the cell pointer $P_c$ is set at the next cell $92_1$. Thereafter, the steps SB3 to SB8 are repeated.

If the judgment result of the step SB3 is "Yes", the distribution monitoring and cell splitting section 30 calculates a result obtained by dividing the sum of the "appearance frequencies" of the cells $92_0$ to $92_{10}$, . . . shown in FIG. 4B by the internal variable CNT, as an average value AV and then returns to the main routine shown in FIG. 5. In a step SA9, if the difference between the internal variable MAX and the average value AV is greater than a preset threshold value, then the distribution monitoring and cell splitting section 30 judges that the distribution of the sort target data group 90 is deflected and the judgment result becomes "Yes".

In a step SA10, the sorting mode selection section 40 selects the quick sorting mode as a sorting mode in response to the judgment result of the step SA9. This quick sorting is a sorting mode effective for accelerating sorting speed if the distribution of the sort target data group 90 is deflected. In a step SA11, the sorting segment setting section 60 sets the sorting segments of the distribution measurement cell 90 shown in FIG. 4B.

Specifically, the sorting segment setting section 50 sets the number of cells of the distribution measurement cell 92 at 1. As a result, quick sorting is applied to all the data in the sort target data group 90. In a step SA12, the sorting execution section 60 executes quick sorting to the sort target data group 90. In a step SA13, the sorting execution section 60 displays the sorting result of the quick sorting on the display section 70 as sorting result data 91 (see FIG. 3B).

If the judgment result of the step SA9 is "No", the sorting mode selection section 40 sets the cell pointer PC at the forefront cell $92_0$ of the distribution measurement cell 92 shown in FIG. 4C in a step SA14. In a step SA15, the sorting mode selection section 40 judges whether or not the appearance frequency (=65000) of the cell (cell $92_0$ in this case) corresponding to the cell pointer $P_c$ is equal to or higher than a preset threshold value C2 (=32768). In this case, the judgment result by the sorting mode selection section 40 in the step SA15 is "Yes".

In a step SA16, the sorting mode selection section 40 sets the "sorting mode" of the cell (cell $92_0$) corresponding to the cell pointer $P_c$ at the quick sorting mode (which is expressed as "quick" in FIG. 4C) as a sorting mode in response to the judgment result of the step SA15. If the judgment result of the step SA15 is "No", the sorting mode selection section 40 sets the "sorting mode" of the cell corresponding to the cell pointer $P_c$ at the radic sorting mode (which is expressed as "radic" in FIG. 4C) as a sorting mode in a step SA17. In a step SA18, the sorting mode selection section 40 judges whether or not the cell pointer $P_c$ points at the final cell of the distribution measurement cell 92 and the judgment result in this case is assumed to be "No".

In a step SA19, the sorting mode selection section 40 advances the cell pointer $P_c$ shown in FIG. 4C by one. By doing so, the cell pointer $P_c$ is set at the next cell $92_1$. Thereafter, the steps SA15 to SA19 are repeated, whereby the "sorting mode" of each of the cells $92_1$ to $92_{10}$, . . . shown in FIG. 4C is set at either the quick sorting mode or the radic sorting mode.

If the judgment result of the step SA18 is "Yes", the sorting segment setting section 50 executes the processings after a step SA20 shown in FIG. 6. In the processings after the step SA20, the sort target data group 90 (see FIG. 3A) is portioned out to cells $92_0$ to $92_{10}$, . . . as shown in FIG. 4D. To be specific, in the step SA20, the sorting segment setting section 50 assigns 0 to an internal variable SUM. In a step SA21, the sorting segment setting section 50 sets the cell pointer $P_c$ at the forefront cell (cell $92_0$) of the distribution measurement cell 92 shown in FIG. 4D.

In a step SA22, the sorting segment setting section 50 judges whether or not the cell pointer $P_c$ points at the final cell of the distribution measurement cell 92 and the judgment result in this case is assumed to be "No". In a step SA23, the sorting segment setting section 50 sets the data pointer $P_d$ at data (sort target data $D_1$ in this case) at a position shifted right by the internal variable SUM (0 in this case) from the forefront (sort target data D1) of the sort target data D1 to D111002, . . . shown in FIG. 8A (the sort target data group 90 shown in FIG. 3A).

In a step SA24, the sorting segment setting section 50 sets an exchange data pointer $P_{a0}$ at the position of the data pointer $P_d$. In a step SA25, the sorting segment setting section 50 adds the "appearance frequency" (65000 in this case) of the cell (cell $92_0$ in this case) corresponding to the cell pointer $P_c$ of the distribution measurement cell 92 (see FIG. 4D), to the present internal variable SUM (=0), and the addition result is set as the variable SUM (65000 in this case). In a step SA26, the sorting segment setting section 50 advances the cell pointer $P_c$ of the distribution measurement cell 92 (see FIG. 4D) by one.

By doing so, the cell pointer $P_c$ is positioned at the next cell $92_1$. Thereafter, the processings of the steps SA22 to SA26 are repeated, whereby exchange data pointers $P_{a1}$ to $P_{a3}$, ... are set at the forefront sort target data of sorting segments K0 to K3, ..., respectively, as shown in FIG. 8A. The sorting segments K0 to K3, ... correspond to the cell numbers 0 to 3, ... of the distribution measurement cell 92 (see FIG. 4D). The number of sort target data (65000, 31000, 15000, ...) existing in the sorting segments K0 to K3, ... correspond to "appearance frequencies" in the distribution measurement cell 92 (see FIG. 4D).

If the judgment result of the step SA22 is "Yes", in the step SA27, the sorting segment setting section 50 stores the sort target data D1, D65001, D96001, D110001, ... corresponding to the exchange data pointers $P_{a0}, P_{a1}, P_{a2}, P_{a3}$, ... in a stack 93 as shown in FIG. 8A. The stack 92 is a region secured in the storage section 20.

In a step SA28, the sorting segment setting section 50 advances all the exchange data pointers $P_{a0}, P_{a1}, P_{a2}, P_{a3}$, ... by one. In a step SA29, the sorting segment setting section 50 fetches one sort target data (sort target data D1 in FIG. 8B) from the stack 93 as shown in FIG. 8B. In a step SA30, the sorting segment setting section 50 determines a sorting segment (sorting segment K1 in this case) corresponding to the sort target data D1 as in the case of the step SA4.

In a step SA31, the sorting segment setting section 50 fetches the sort target data (sort target data D65002 in this case) pointed at by the exchange pointer (exchange pointer $P_{a1}$ in this case) of the sorting segment (sorting segment K1 in this case) determined in the step SA30. In a step SA32, the sorting segment setting section 50 stores the sort target data (sort target data D1 in this case) fetched from the stack 93 in the step SA29 at the data position (65001) pointed at by the exchange pointer (exchange pointer $P_{a1}$ in this case) in the step SA31.

In a step SA33, the sorting segment setting section 50 judges whether or not the exchange data pointer (exchange data pointer $P_{a1}$ in this case) is located at the end of the corresponding sorting segment, and the judgment result in this case is assumed to be "No". In a step SA34, the sorting segment setting section 50 advances the exchange data pointer (exchange data pointer $P_{a1}$ in this case) by one. If the judgment result of the step SA33 is "Yes", the sorting segment setting section 50 deletes the exchange data pointer in a step SA35.

In a step SA36, the sorting segment setting section 50 stores the sort target data (sort target data D65002 in this case) fetched in the step SA31 in the stack 93. Namely, the sort target data D1 is exchanged to the sort target data D6502. In a step SA37, the sorting segment setting section 50 judges whether or not an exchange data pointer exists, and the judgment result in this case is assumed to be "Yes". Thereafter, the processings of the steps SA29 to SA37 are repeated, thereby portioning out the sort target data.

If the judgment result of the step SA3 is "No", the sorting segment setting section 50 stores the sort target data in the stack 93 in a corresponding sorting segment in a step SA38. By doing so, the sort target data D1 to D111002, ... shown in FIG. 8A are portioned out to the sorting segments K0 to K3, ... FIG. 4D shows a state in which a plurality of sort target data ([1,1], [1,5], ...) are portioned out.

In a step SA39, the sorting execution section 60 executes sorting to the sort target data portioned out in sorting segment units based on the "sorting modes" of the distribution measurement cell 92, respectively. To be specific, the quick sorting mode (see "quick" in the cell $92_0$ in FIG. 4D) is applied to the sort target data in the sorting segment K1 (see FIG. 8B).

Further, the radic sorting mode (see "radic" in the cell $92_1$ in FIG. 4D) is applied to the sort target data in the sorting segment K2. The same thing is true for the sort target data in the sorting segment K3 and the following. In a step SA40, the sorting execution section 60 displays the sorting result of the quick sorting on the display section 70 as sorting result data 91 (see FIG. 3B).

Now, a comparison example of comparing the sorting speed of conventional quick sorting to sorting speed in this embodiment while the same sort target data are sorted is shown below. As can be seen, according to this embodiment, it is possible to greatly accelerate sorting speed compared with the conventional sorting speed.

| (sort target data) | (conventional sorting speed) | (sorting speed in this embodiment) |
|---|---|---|
| data from 0 to 10 million are arranged at random | 30 seconds | 21 seconds |
| word group included in 5,000 patent abstracts | 174.615 seconds | 123.206 seconds |
| word group included in 190,000 patent abstracts | 5964 seconds | 5063 seconds |

As stated above, according to one embodiment of the present invention, sorting segments are set based on the result of analyzing the distribution of the sort target data group 90, the appearance frequency of the sort target data is obtained for each sorting segment, and either the quick sorting mode or the radio sorting mode is selected for each sorting segment depending on the result of the comparison of the appearance frequency to the threshold value. Thus, it is possible to automatically select a sorting mode corresponding to the distribution (properties and quantity) of the sort target data group and to accelerate sorting speed compared with conventional sorting speed.

One embodiment according to the present invention has been described in detail with reference to the drawings. The concrete examples of the constitution of the present invention should not be limited to this embodiment and any changes in design within the scope of the invention may be included in the present invention. For example, in one embodiment stated above, a sorting program for realizing the functions of the sorting device may be recorded on a computer readable recording medium 200 shown in FIG. 9, and the sorting program recorded on the recording medium 200 may be read and executed by a computer 100 shown in FIG. 9 to thereby execute sorting.

Figure 9:
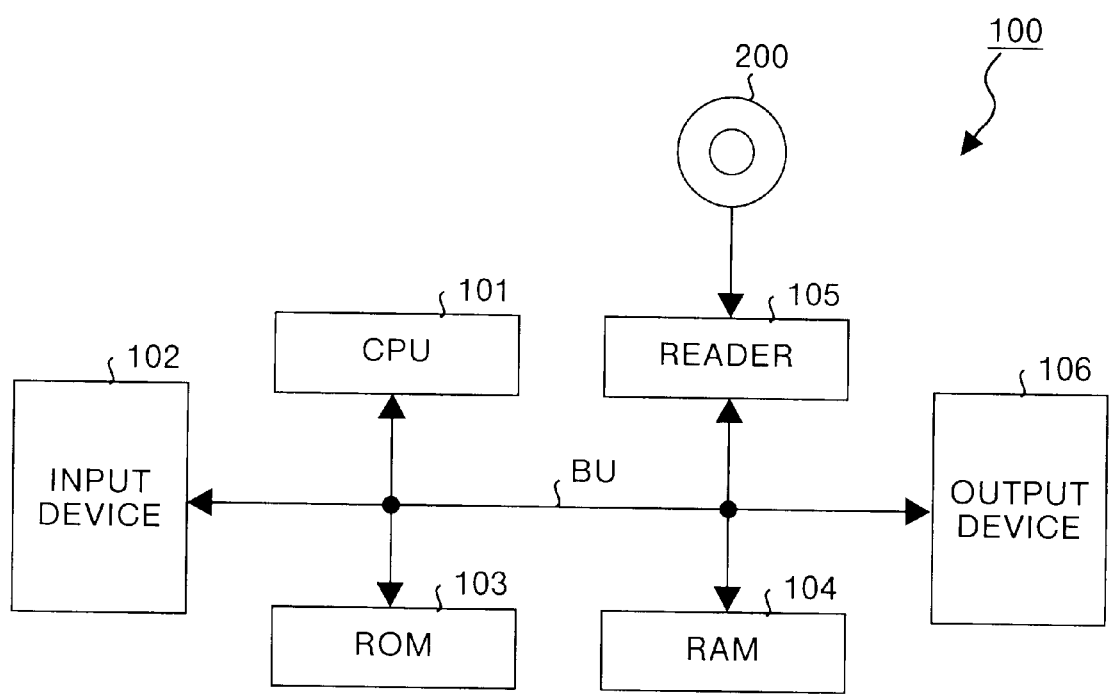
FIG. 9 is a block diagram showing a modification of this embodiment.

The computer 100 shown in FIG. 9 consists of a CPU 101 executing the sorting program stated above, an input device 102 such as a keyboard and a mouse, an ROM (Read-only Memory) 103 storing various data, an RAM (Random-access Memory) 104 storing operation parameters, a reader reading the sorting program from the recording medium 200, an output device 106 such as a display and a printer, and a bus BU mutually connecting the constituent elements of the computer 100.

The CPU 101 reads the sorting program recorded on the recording medium 200 through the reader 105 and then executes the sorting program, thereby conducting sorting stated above. Not only a portable type recording medium such as an optical disk, a floppy disk or a hard disk but also a transmission medium temporarily recording and storing data such as a network may be used as the recording medium 200.

As stated so far, according to the present invention, sorting segments are set based on the result of analyzing the distribution of the sort target data group, the appearance frequency of the sort target data is obtained for each sorting segment, and either the first sorting mode or the second sorting mode is selected for each sorting segment depending on the result of the comparison of the appearance frequency to the threshold value. Thus, the present invention can advantageously, automatically select a sorting mode corresponding to the distribution (properties and quantity) of the sort target data group and accelerate sorting speed compared with conventional sorting speed.

Furthermore, a plurality of sort target data are portioned out to the respective sorting segments thus set. Due to this, the present invention can advantageously execute sorting at high speed based on the automatically selected sorting mode.

Moreover, if the distribution of the sort target data is deflected, only the fist sorting mode is selected and if the distribution is not deflected, either the first or second sorting mode is selected based on the distribution analysis result. Thus, the present invention can advantageously, automatically select an optimum sorting mode corresponding to the distribution (properties and quantity) of the sort target data.

Additionally, either the quick sorting mode or the radic sorting mode is selected and the selection result is applied to each sorting segment. Thus, the present invention can advantageously makes effective use of the advantages of the quick sorting and the radic sorting and accelerate sorting speed.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A sorting device comprising:
   a distribution analyzing unit which analyzes a distribution of a sort target data group consisting of a plurality of sort target data;
   a setting unit which sets sorting segments for dividing the sort target data group into segments based on an analysis result of said distribution analyzing unit;
   an appearance frequency calculation unit which calculates an appearance frequency of a sort target data corresponding to each sorting segment based on a sorting key;
   a sorting mode selection unit which selects a first sorting mode if the appearance frequency is equal to or higher than a preset threshold value and selecting a second sorting mode if the appearance frequency is lower than the threshold value, for each sorting segment; and
   a sorting execution unit which executes sorting for each of the sorting segments based on the sorting mode selected by said sorting mode selection units,
   wherein said sorting mode selection unit selects only the first sorting mode if the distribution shows deflection, and selects the first or second sorting mode if the distribution does not show deflection, based on the result of analysis by said distribution analyzing unit, and
   wherein said sorting execution unit applies the first sorting mode to all of the sort target data if the distribution shows deflection, and applies the first or second sorting mode to the sort target data in the respective sorting segments if the distribution does not show deflection.

2. The sorting device according to claim 1 further comprising a portioning-out unit for portioning out sort target data to the sorting segments set by said setting unit based on the sorting key.

3. The sorting device according to claim 1, wherein the first sorting mode corresponds to quick sorting mode and the second sorting mode corresponds to radic sorting mode.

4. A sorting method comprising:
   a distribution analyzing step of analyzing a distribution of a sort target data group consisting of a plurality of sort target data;
   a setting step of setting sorting segments for dividing the sort target data group into segments based on the result of analysis in the distribution analyzing step;
   an appearance frequency calculation step of obtaining an appearance frequency of a sort target data corresponding to each sorting segment based on a sorting key;
   a sorting mode selection step of selecting a first sorting mode if the appearance frequency is equal to or higher than a preset threshold value and selecting a second sorting mode if the appearance frequency is lower than the threshold value, for each sorting segment; and
   a sorting execution step of executing sorting for each of the sorting segments based on the sorting mode selected in the sorting mode selection step,
   wherein in the sorting mode selection step, only the first sorting mode if the distribution shows deflection, and one of the first or second sorting mode if the distribution does not show deflection, based on the result of analysis in the distribution analyzing step, and
   wherein in the sorting execution step, the first sorting mode is applied to all of the sort target data if the distribution shows deflection, and one of the first or second sorting mode to the sort target data in the respective sorting segments if the distribution does not show deflection.

5. The sorting method according to claim 4 further comprising:
   a portioning-out step of portioning out the plurality of sort target data to the sorting segments set in the setting step based on the sorting key.

6. The sorting method according to claim 4, wherein the first sorting mode corresponds to quick sorting mode and the second sorting mode corresponds to radic sorting mode.

7. A computer readable medium for storing instructions, which when executed on a computer, causes the computer to perform:
   a distribution analyzing step of analyzing a distribution of a sort target data group consisting of a plurality of sort target data;
   a setting step of setting sorting segments for dividing the sort target data group into segments based on the result of analysis in the distribution analyzing step;
   an appearance frequency calculation step of obtaining an appearance frequency of a sort target data corresponding to each sorting segment based on a sorting key;
   a sorting mode selection step of selecting a first sorting mode if the appearance frequency is equal to or higher than a preset threshold value and selecting a second sorting mode if the appearance frequency is lower than the threshold value, for each sorting segment; and a sorting execution step of executing sorting for each of the sorting segments based on the sorting mode selected in the sorting mode selection step, wherein in the sorting mode selection step, only the first sorting mode if the distribution shows deflection, and one of the first or second sorting mode if the distribution does not show deflection, based on the result of analysis in the distribution analyzing step, and wherein in the sorting execution step, the first sorting mode is applied to all of the sort target data if the distribution shows deflection, and one of the first or second sorting mode to the sort target data in the respective sorting segments if the distribution does not show deflection.

* * * * *